United States Patent [19]

Nelb, II et al.

[11] 4,420,603

[45] Dec. 13, 1983

[54] CONTINUOUS, SOLVENT-FREE PROCESS FOR PREPARING THERMOPLASTIC POLYAMIDES AND POLYESTERAMIDES

[75] Inventors: Robert G. Nelb, II, North Haven; Richard W. Oertel, III, Guilford, both of Conn.

[73] Assignee: The Upjohn Company, Kalamazoo, Mich.

[21] Appl. No.: 424,419

[22] Filed: Sep. 27, 1982

[51] Int. Cl.³ ............................................... C08G 18/32
[52] U.S. Cl. .................................. 528/80; 528/85; 528/480; 528/501; 528/502
[58] Field of Search ............... 528/80, 85, 501–502, 528/480

[56] References Cited

U.S. PATENT DOCUMENTS

| | | | |
|---|---|---|---|
| 3,477,094 | 11/1969 | Maahs et al. | 18/2 |
| 3,492,791 | 2/1970 | Evans | 55/36 |
| 3,493,031 | 2/1970 | Williams et al. | 159/2 |
| 3,773,738 | 11/1973 | Porter et al. | 260/78 R |
| 3,833,546 | 9/1974 | Takekoshi et al. | 260/47 CP |
| 4,011,198 | 3/1977 | Takekoshi et al. | 260/47 CP |
| 4,073,773 | 2/1978 | Banucci et al. | 260/47 CP |
| 4,087,481 | 5/1978 | Onder | 260/857 TW |
| 4,096,129 | 6/1978 | Cook | 528/85 X |
| 4,115,372 | 9/1978 | Onder | 528/73 |
| 4,153,501 | 5/1979 | Fink et al. | 528/501 X |
| 4,156,065 | 5/1979 | Onder et al. | 528/51 |
| 4,371,684 | 2/1983 | Quiring et al. | 528/85 X |
| 4,385,171 | 5/1983 | Schnabel et al. | 528/501 X |

*Primary Examiner*—Lucille M. Phynes
*Attorney, Agent, or Firm*—Denis A. Firth; John Kekich

[57] ABSTRACT

A continuous, solvent-free process is described for the preparation of thermoplastic polyamides and polyesteramides by the reaction of the appropriate organic diisocyanate and dicarboxylic acid or difunctional carboxylic acid-terminated polyester.

12 Claims, No Drawings

CONTINUOUS, SOLVENT-FREE PROCESS FOR PREPARING THERMOPLASTIC POLYAMIDES AND POLYESTERAMIDES

BACKGROUND OF THE INVENTION

1. Field of the Invention

This invention relates to a process for the preparation of polyamides and related compounds and is more particularly concerned with a continuous solvent-free process for the reaction of organic diisocyanates with dicarboxylic acids and related compounds to form the corresponding polymers containing recurring amide linkages.

2. Description of the Prior Art

The preparation of polyamides, i.e. polymers which contain a recurring amide linkage, by reaction of organic diamines with dicarboxylic acids and derivatives thereof such as acid chlorides, is well-known in the art. Such processes include solvent-free reactions in which the polymer is produced by melt condensation of the reaction components. Where the reactants are diamines and dicarboxylic acids, the reaction produces water of condensation and a number of methods of separating the water as steam from the reaction mixture are known. Illustrative of such methods and apparatus for achieving the result are those described in U.S. Pat. Nos. 3,477,094; 3,492,791; 3,493,031; and 3,773,738.

More recently the production of polyamides by reaction of organic diisocyanates with dicarboxylic acids and related compounds has been described; see, for example, U.S. Pat. Nos. 4,087,481; 4,115,372; and 4,156,065. In the case of these latter reactions the condensation results in the elimination of carbon dioxide. Hitherto, the reaction has been conducted in the presence of inert organic solvents. However, for commercial production the use of organic solvents of the type required is extremely undesirable both from the point of view of economics and from the requirement to avoid pollution of the atmosphere by discharge of such solvents from production facilities.

So far as Applicants know no method has previously been described which enables the reaction between the diisocyanate and the dicarboxylic acid to be carried out in the absence of such organic solvents. In particular, no such solvent-free reaction which can be operated on a continuous basis has been described.

It is an object of the present invention to provide a process which can be carried out continuously and in the absence of inert organic solvents and which can be used to produce polymers containing amide linkages by reaction of organic diisocyanates with dicarboxylic acids or related compounds.

SUMMARY OF THE INVENTION

This invention comprises a continuous process for the preparation of a thermoplastic polymer characterized by the presence of a recurring amide group which process comprises the steps of:

continuously feeding an organic diisocyanate and a dicarboxylic acid in substantially stoichiometric proportions to the inlet port of a continuous reactor;

continuously conveying said mixture of reactants through said reactor and increasing the temperature of said mixture incrementally from an initial temperature at which evolution of carbon dioxide first commences in substantial quantity to a final temperature at which polymer formation is substantially complete, the rate of said incremental increase in temperature being adjusted so that the carbon dioxide which is evolved continuously during the reaction can be vented completely from a plurality of vents provided at intervals throughout said reactor; and continuously removing the resulting polymer from said reactor via a shaping zone.

DETAILED DESCRIPTION OF THE INVENTION

The reaction between an organic diisocyanate and a dicarboxylic acid can be represented schematically as follows:

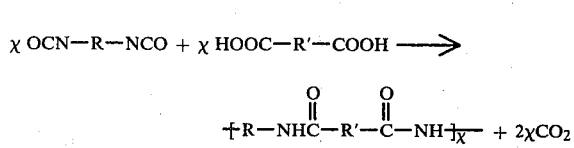

wherein R is the residue of the organic polyisocyanate and R' is the residue of the dicarboxylic acid. It will be seen that the reaction gives rise to two moles of carbon dioxide for each mole of diisocyanate and dicarboxylic acid which react. The venting of this relatively large volume of carbon dioxide can be controlled reasonably well when the reaction is conducted in an inert organic solvent, particularly in a batch procedure. However, the venting of the carbon dioxide presents a somewhat greater problem when the reaction is attempted in the absence of a solvent, particularly if the reaction is to be carried out on a continuous basis. Thus, attempts to carry out the process in conventional continuous reactors can lead to severe mechanical problems since the evolution of the carbon dioxide in the molten liquid reaction mixture tends to cause foaming with consequent blocking of vents which may be provided in the reactor.

We have now found that the various problems associated with seeking to carry out the reaction between the diisocyanate and the dicarboxylic acid in the absence of solvent can be overcome in a convenient manner by carrying out the process in accordance with the present invention. In particular, we have found that the process can be carried out successfully on a continuous basis to give polymers which have all the desirable properties hitherto associated with the corresponding polymers produced in the presence of inert organic solvent.

The key to success of the instant process is to conduct the reaction between the organic diisocyanate and the dicarboxylic acid in such a way that the evolution of carbon dioxide is caused to occur at a rate which is controlled so that the gaseous carbon dioxide can be vented adequately, smoothly and completely without causing frothing of the reaction or generating other problems which previously led to blocking of vents and resulted in failure to achieve continuity of the reaction process.

Thus, we have found that polymerization reactions of the type described above, which involve the evolution of substantial quantities of gaseous by-product, can be conducted successfully in conventional continuous reactors by initiating the reaction at a relatively low temperature, within the range of temperatures at which the reaction will take place, and then increasing the reaction temperature on a stepwise basis as the reaction mixture is caused to pass through the reactor. The actual rate at which the reaction temperature is raised, and the number of steps or increments by which the reaction temperature is raised, will depend largely upon the venting capabilities with which the reactor is provided.

Illustrative of the continuous reactors which can be employed in carrying out the process of the invention are single and twin screw reactor-extruders. Materials which are fed to the inlet ports of such apparatus are generally subjected to a high degree of mixing, not only in the initial stages but while the materials are traversing the entire length of the apparatus. The continuous mixing is achieved as the material is propelled along the length of the apparatus by the rotating screw or screws and the material is constantly being spread as a relatively thin film in the narrow gap between the lands of the screw and the inner wall of the barrel of the apparatus. This means that any gaseous by-product, e.g. carbon dioxide, which is generated in the reaction is less likely to be trapped in the interior of a mass of reaction mixture and, provided adequate venting is provided, can be readily removed from the surface of the aforementioned thin film of reaction mixture.

Further, the various reactor-extruders are generally provided with a series of independently operated heating elements which permit the temperature of the inner surface of the barrel to be varied along its length. In the case of the process of the present invention this feature of the reactor-extruders enables one to achieve the required incremental increases in temperature of the reaction mixture as it progresses through the apparatus.

The reactor-extruders are also provided with the capability of extruding the end-product in any of a variety of shapes or forms as the reaction product is removed from the reactor. Finally, the residence time of the reaction mixture in the apparatus can be adjusted within a reasonably wide range, for example, by adjustment of the speed of rotation of the screw(s) and or by introducing devices which give rise to back pressures and hence retardation of rate of flow of the reactants through the apparatus.

Other types of continuous reactors which can be employed in carrying out the process of the invention include wiped thin film evaporators which are conventionally employed in the stripping of volatile materials such as solvents or other relatively low boiling materials from components having relatively high boiling points. In the case of the process of the invention the volatile material being removed is the carbon dioxide. Such apparatus is generally provided with means for controlling the temperature of the feedstock as it is passed through the apparatus and these means can be readily used or adapted to provide the controlled, incremental increase in reaction temperature which is a feature of the instant process. The reaction product, after passage through the wiped thin film evaporator, can, if desired, be conveyed directly to an extruder for the purposes of shaping and pelletizing the product. Certain of the thin film evaporators which are available commercially actually incorporate an extrusion zone in the exit port.

In carrying out the process of the invention the various reactants, in substantially stoichiometric proportions (i.e. proportions such that the ratio of equivalents of isocyanate to equivalents of carboxylic acid groups is approximately $1.0 \pm 0.03$), are fed in continuous streams to the inlet port of whatever type of continuous reactor is being employed. Advantageously the reactants are brought together in molten form from appropriate holding tanks where the reactants are maintained in the molten state. If desired, the various reactants are stored in separate storage tanks or like containers and fed as separate streams, in the required proportions, to the continuous reactor. Alternatively, the various carboxylic acid compounds (where more than one such component is used) can be preblended and stored in a single storage container or can be blended with each other immediately prior to introduction to the reactor. Other components such as antioxidants, lubricants, catalysts (as hereinafter described) and the like can also be fed as separate streams or preblended with any other component with which they are compatible and stable on storage.

The final admixture of the diisocyanate and the dicarboxylic acid component(s) can be effected in the initial zone of the continuous reactor particularly where the latter is a single or twin screw reactor-extruder. Alternatively, the reactants can be admixed, using any of static or mechanical mixing devices commonly employed to achieve efficient mixing of chemically reactive components, immediately prior to being introduced, in a continuous stream of mixed reactants, via the inlet port of the continuous reactor. This premixing of the reactants is generally employed when the continuous reactor is a wiped thin film evaporator.

In yet another alternative, part of one or both reactants is admixed in the initial zone and additional quantities of one or both reactants can be added downstream in order to achieve better control of the evolution of carbon dioxide.

Whichever method of introducing the reactants into the continuous reactor is adopted the reactants are advantageously in molten form, as discussed above, and at temperatures within the range of about 80° C. to about 120° C. at the time of mixing. In most cases the reaction between the diisocyanate and the dicarboxylic acid will commence immediately upon admixture especially where a catalyst is present in the reaction mixture. The reaction is exothermic and, in order to control the rate of carbon dioxide evolution, it is necessary to control the rate at which the temperature of the reaction mixture rises. This control is achieved by controlling the heat supplied to, or withdrawn from, the reaction mixture as it progresses through the reactor. The latter is provided with a plurality of zones each of which can be heated or cooled, by any appropriate means, independently of the others. Thus, in this way the temperature of the reaction mixture, as it passes through the reactor, is controlled in such a manner that it increases in increments as the reaction mixture progresses from each temperature-controlled zone to the succeeding zone.

Further, the size of the increments of increased temperature, the residence time of the reaction mixture in each of the separate zones and the actual number of zones are adjusted in accordance with the process of the invention so that the volume of carbon dioxide, being evolved in the various zones in the steady state of the continuous reaction, does not exceed the venting capacity of the apparatus. The most appropriate combination of the above parameters will obviously vary depending upon the rate characteristics of the particular reactants employed in any given instance but can be determined by a process of trial and error.

Generally speaking, the reaction temperature in the various zones will increase from a value in the initial stage of the reactor of about 120° C. to 180° C. to a value in the final stage or zone of the reactor of about 250° C. to about 300° C. Depending upon the number of zones of independently controlled temperature which are employed, the increments by which the reaction temperature is increased will fall within the range of about 20° C. to about 80° C. These increments are preferably of substantially equal amounts throughout the reactor but it may be necessary in certain cases to employ larger increments in some zones than in others. Further, as will be apparent to one skilled in the art, it may be necessary in certain instances to maintain the reaction temperature at a given level for a longer period then that employed at other levels and this can be achieved by making appropriate adjustments to the length of the various temperature-controlled zones.

It has been found, in general terms, that at least three independently controlled heating zones should be employed, and preferably at least five such zones, in order to achieve satisfactory control of the polymerization reaction. Ideally, each of the zones employed should have at least one means for venting of the carbon dioxide, although this is not essential and depends to a large extent on the particular scale of production being employed. Any of the venting means conventionally employed for reactor-extruders can be employed where the latter type of apparatus is employed in the process of the invention. In the case of the use of wiped thin film evaporators the means for venting is usually already present, as noted previously.

The average residence time of the reaction mixture, in each of the individual zones and in the apparatus as a whole, is controlled by a number of factors including the number and internal geometry of the various zones in the reactor, the rate of propulsion of the reaction mixture and the rate at which it is possible to vent the carbon dioxide from the apparatus using the venting capacity available. In general terms the average residence time in the reactor can be varied within the range of about 0.5 minutes to about 10 minutes and is preferably within the range of about 2 minutes to about 5 minutes.

In the final stage of the process of the invention the polymer derived by the reaction is removed from the continuous reactor via a shaping zone. At this stage the formation of the polymer is advantageously substantially complete, i.e. the formation of amide groups has proceeded to the extent of at least 95 percent theoretical and preferably to the extent of about 98 percent theoretical and little or no significant amount of carbon dioxide remains to be eliminated. The shaping zone generally takes the form of a conventional extrusion die which forms the product into a ribbon or plurality of ribbons or a continuous strand or sheet of any desired configuration. The molten extrudate is then cooled or allowed to cool, for example, by underwater die-faced cutting or by direct extrusion into a water cooling bath or onto a continuous belt where the material is cooled by air or inert gas, and the cooled material is then chopped, granulated, pelletized or otherwise converted to a form in which it can be easily employed for subsequent injection molding. In a particular embodiment the extrudate is passed directly into a cooling bath and subjected to comminution.

The product so obtained is generally a finished polymer which possesses comparable properties to those of the same polymer prepared by the prior art solvent processes and can be employed for all the same purposes at the latter polymers. However, it is sometimes found that the conversion to required polymer is not quite complete when the product is recovered from the continuous reactor in the manner described above. Such a product can be readily treated to complete the formation of polymer by subjecting the product to a second melt extrusion under conditions which permit venting of any additional carbon dioxide which may be evolved.

The process of the invention can be employed to prepare thermoplastic polymers having recurring amide groups by the reaction of organic diisocyanates with dicarboxylic acids or dicarboxylic acid-terminated prepolymers. Any of the organic diisocyanates known in the art can be employed in the process of the invention. Illustrative of such diisocyanates are 4,4'-methylenebis(phenyl isocyanate), mixtures of 4,4'- and 2,4'-methylenebis(phenyl isocyanate), 2,4-toluene diisocyanate, 2,6-toluene diisocyanate, dianisidine diisocyanate, tolidine diisocyanate, m-xylylene diisocyanate, hexamethylene diisocyanate, 4,4'-methylenebis(cyclohexyl isocyanate), 1,5-naphthalene diisocyanate, 1,4-diethylbenzene-$\beta,\beta'$-diisocyanate, as well as mixtures of any two or more of said diisocyanates.

Any of the dicarboxylic acids previously employed in the art to prepare polyamides can be employed in the process of the invention. Illustrative of said acids are aromatic dicarboxylic acids such as isophthalic, terephthalic, phthalic, benzophenone dicarboxylic and diphenylene dicarboxylic acids and the like; aliphatic dicarboxylic acids such as succinic, adipic, azelaic, pimelic, glutaric, sebacic, decanedioic, dodecanedioic and brassylic acids and the like. A mixture of two or more of the above acids can be employed if desired.

The dicarboxylic acid-terminated prepolymers which are employed in preparing thermoplastic polyesteramides in accordance with the process of the invention can be prepared in a variety of ways. Illustratively the prepolymers can be obtained by reacting an excess (the magnitude of which depends on the final molecular weight desired) of a dicarboxylic acid, which can be any of those described and identified above including mixtures of two or more of said acids, with a monomeric or polymeric diol. The monomeric diols can be any of those conventionally employed in the preparation of polyester diols. Illustrative of monomeric diols are ethylene glycol, propylene glycol, 1,4-butanediol, 1,2-hexanediol, 1,5-pentanediol, and the like.

The polymeric diols which are employed in the preparation of the carboxylic acid-terminated prepolymers as described above, can be any polyether or polyester diols having molecular weights within the range of about 400 to about 4000. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene and the like and copolymers of said alkadienes with vinyl monomers such as acrylonitrile, methacrylonitrile, styrene, and the like. Particularly preferred polyether diols for use in preparing the polyester amides of the invention are poly(tetramethylene glycol) and ethylene oxide capped polypropylene glycols wherein the ethylene oxide content is within the range of about 5 percent to about 40 percent.

Illustrative of the polyester diols are those obtained by reacting a dicarboxylic acid or a mixture of dicarboxylic acids such as adipic, suberic, azelaic, glutaric, 1,12-dodecanedioic acids, and the like, with an excess, over the stoichiometric amount, of a dihydric alcohol such as ethylene glycol, propylene glycol, 1,4-butanediol, and the like, including mixtures of two or more such diols.

Advantageously, the process of the invention can be carried out in the presence of a catalyst. Any of the catalysts known in the art for the reaction between an isocyanate group and a carboxylic acid group can be used. Illustrative of such catalysts are alkali metal alkoxides as described in U.S. Pat. No. 4,001,186, N-alkali metal lactamates as described in U.S. Pat. No. 4,021,412 and phospholene-1-oxides, phospholane-1-oxides, phosphetane-1-oxides, and the corresponding 1-sulfides as described in U.S. Pat. No. 4,156,065. A preferred group of catalysts are the phospholene-1-oxides of which 1,3-dimethyl-2-phospholene-1-oxide, 1,3-dimethyl-3-phospholene-1-oxide and mixtures thereof are typical. The catalysts, when present, are generally employed in amounts from about 0.001 percent by weight to about 5 percent by weight of total reactants depending upon the nature of the catalyst and the desired rate of reaction.

The polyamides and polyesteramides which are prepared in accordance with the process of the present invention can be employed in any of the many applications which have already been established for the same polyamides and polyesteramides which were prepared in the presence of inert organic solvents in accordance with procedures already known in the art. Such applications include molding by extrusion of hose, tubing, wire coating and the like, and injection molding to produce articles such as bushings, seal faces, compressor vanes and impellers, pistons and piston rings, gears, thread guides, cams, brake linings, clutch faces, abrasives, and the like.

The following example describes the manner and process of making and using the invention and sets forth the best mode contemplated by the inventors of carrying out the invention but is not to be construed as limiting.

EXAMPLE 1

The carboxylic acid-terminated hexamethylene adipate employed in the following procedure was prepared as follows:

To a 500 gallon reactor was charged 1614 lb. of hexamethylene adipate diol [Rucoflex S105-110; Hooker; Eq. wt ca500], 345 lb. of azelaic acid, 265 lb. of adipic acid (Du Pont), 717 g. p-toluene sulfonic acid monohydrate, and 1081 lb. xylenes. The reaction solution was heated to the reflux temperature and the water evolved from the condensation reaction was removed by azeotropic distillation. At the completion of the reaction the reactor contents were cooled to 100°–120° C. and the xylenes were removed by vacuum distillation. The product, 2169 lbs, has an acid number of 103 (Eq. wt.=545).

The apparatus employed in the following procedure was a twin screw reactor-extruder (Werner and Pfleiderer Model ZDS K28) equipped with five sections each provided with independent heat control units. The co-rotating twin screws were each 77.1 cm. in length and 28 mm. in diameter. The sections in the first 13.5 cm. of the screws (starting from the feed zone) were of deep flight (45 degree pitch) to provide initial strong propulsion of the feed mixture while all the succeeding sections were of shallower pitch (30°). Neither of the two screws was provided with kneading blocks. Two vent ports were provided in the barrel of the apparatus; one was at a distance of about 28.0 cm. from the feed port and the other about 53.0 cm. from said feed port. The apparatus was provided with means for purging the vent ports and the feed port with a continuous stream of inert gas.

The following procedure was adopted in preparing a thermoplastic polyesteramide.

A total of 54.37 lbs. of the azelaic acid-terminated hexamethylene adipate prepared as described above, 11.28 lbs. of azelaic acid, 0.94 lbs. of antioxidant (Irganox 1098) and 0.14 lbs. of a mixture of 1,3-dimethyl-2-phospholene-1-oxide and 1,3-dimethyl-3-phospholene-1-oxide was charged to a 20 gallon reactor and heated to approximately 120° C. with stirring under vacuum for 16 hr. to degas. The acid number of the resulting mixture was determined to be 309.9. To the mixture was added 0.2 percent w/w of Antifoam A (Dow Corning) and the mixture was maintained at 120° C. with stirring. 4,4'-methylenebis(phenol isocyanate) was maintained molten at 60° C. under nitrogen in a second storage tank. The molten premixed acid components and the molten diisocyanate were metered separately and continuously into the feed section of the above-described apparatus in such proportions that the ratio of equivalents of isocyanate to equivalents of carboxy groups was maintained at 1.015:1. The rate of feeding of total reactants was maintained at about 6.5 lbs/hour. The apparatus was operated at a screw speed of 175 rpm with the temperature of each of the sections of the barrel at the following values (all values±10° C.).

| Feed zone | 2nd zone | 3rd zone | 4th zone | 5th zone |
| --- | --- | --- | --- | --- |
| 177° C. | 204° C. | 288° C. | 288° C. | 288° C. |

The product was removed from the extrusion zone, cooled in air and granulated after solidification. The polymer so obtained was found by TGA (Thermal gravimetric analysis under nitrogen using thermal gradient of 10° C./minute) to have undergone approximately 98.3 percent conversion. In order to complete the polymer formation an aliquot was passed through the same reactor-extruder as used in the initial polymerization but operating the screws at a speed of 75 rpm with the following temperatures in the five zones.

| Feed zone | 2nd zone | 3rd zone | 4th zone | 5th zone |
| --- | --- | --- | --- | --- |
| 260° C. | 271° C. | 277° C. | 277° C. | 277° C. |

The polymer was extruded as a ribbon and pelletized. The resulting pellets were a clear brown in appearance. The polymer was found to have an inherent viscosity of 0.748 dl/g. [0.5% in N-methylpyrrolidone at 30° C.] and an average molecular weight of 105,220 as determined by gel permeation chromatography using polystyrene standards.

We claim:

1. A continuous process for the preparation of a thermoplastic polymer characterized by the presence of a recurring amide group which process comprises the steps of:

continuously feeding an organic diisocyanate and a dicarboxylic acid in substantially stoichiometric proportions to the inlet port of a continuous reactor;

continuously conveying said mixture of reactants through said reactor and increasing the temperature of said mixture incrementally from an initial temperature at which evolution of carbon dioxide first commences to a final temperature at which polymer formation is substantially complete, the rate of said incremental increase in temperature being adjusted so that the carbon dioxide which is evolved continuously during the reaction can be vented completely from a plurality of vents provided at intervals throughout the said reactor; and continuously removing the resulting polymer from said reactor via a shaping zone.

2. A process according to claim 1 wherein said reactor comprises a continuous mixer-extruder.

3. A process according to claim 1 wherein the said polymer is shaped by extrusion into a continuous ribbon which is pelletized after solidification.

4. A process according to claim 1 wherein the temperature of the reaction mixture is increased incrementally from an initial value in the range of about 120° C. to about 180° C. to a final value in the range of about 250° C. to about 300° C.

5. A process according to claim 1 wherein the organic diisocyanate and the dicarboxylic acid are fed in the molten state to the inlet port of said continuous reactor.

6. A process according to claim 1 wherein the organic diisocyanate is 4,4'-methylenebis(phenyl isocyanate) and the dicarboxylic acid is selected from the group consisting of aromatic dicarboxylic acids, aliphatic dicarboxylic acids, carboxylic acid-terminated polyesters and mixtures of any two or more such acids.

7. A continuous process for the preparation of a thermoplastic polymer characterized by the presence of a recurring amide group which process comprises the steps of:

continuously feeding an organic diisocyanate and a dicarboxylic acid in substantially stoichiometric proportions to the inlet port of a screw reactor-extruder provided with a plurality of vents and equipped with a series of independently heated zones;

continuously conveying said mixture of reactants through said screw reactor-extruder while increasing the temperature incrementally from an initial temperature at which evolution of carbon dioxide first commences to a final temperature at which polymer formation is substantially complete, the rate of said incremental increase in temperature being adjusted so that the carbon dioxide which is evolved continuously during the reaction can be vented completely via said vents in said screw reactor-extruder;

continuously removing said polymer by extrusion in shaped form from said screw reactor-extruder.

8. A process according to claim 7 wherein said polymer is extruded in the form of at least one continuous strand which is pelletized after solidification.

9. A process according to claim 7 wherein the temperature of the reaction mixture is increased incrementally from an initial value in the range of about 120° C. to about 180° C. to a final value in the range of about 250° C. to about 300° C.

10. A process according to claim 7 wherein the organic diisocyanate and the dicarboxylic acid are fed in the molten state to the inlet port of said screw reactor-extruder.

11. A process according to claim 7 wherein the organic diisocyanate is 4,4'-methylenebis(phenyl isocyanate) and the dicarboxylic acid is selected from the group consisting of aromatic dicarboxylic acids, aliphatic dicarboxylic acids, carboxylic acid-terminated polyesters and mixtures of any two or more such acids.

12. A process according to claim 7 werein the organic diisocyanate is 4,4'-methylenebis(phenyl isocyanate) and the dicarboxylic acid is a mixture of azelaic acid and an azelaic acid-terminated hexamethylene adipate.

* * * * *